(12) United States Patent
Parkkonen et al.

(10) Patent No.: US 10,178,444 B2
(45) Date of Patent: Jan. 8, 2019

(54) DEVICE-FRAME FOR TELECOMMUNICATION DEVICES

(71) Applicant: CORIANT OY, Espoo (FI)

(72) Inventors: Pertti Parkkonen, Otalampi (FI); Petri Kohonen, Vantaa (FI)

(73) Assignee: CORIANT OY, Espoo (FI)

( * ) Notice: Subject to any disclaimer, the term of this patent is extended or adjusted under 35 U.S.C. 154(b) by 0 days.

(21) Appl. No.: 15/565,946

(22) PCT Filed: Apr. 15, 2015

(86) PCT No.: PCT/FI2015/050258
§ 371 (c)(1),
(2) Date: Oct. 12, 2017

(87) PCT Pub. No.: WO2016/166400
PCT Pub. Date: Oct. 20, 2016

(65) Prior Publication Data
US 2018/0098135 A1    Apr. 5, 2018

(51) Int. Cl.
*H04Q 1/02* (2006.01)
*H04Q 1/04* (2006.01)

(52) U.S. Cl.
CPC .......... *H04Q 1/035* (2013.01); *H04Q 1/04* (2013.01); *H04Q 1/09* (2013.01)

(58) Field of Classification Search
None
See application file for complete search history.

(56) References Cited

U.S. PATENT DOCUMENTS

| | | | |
|---|---|---|---|
| 4,149,218 A * | 4/1979 | Carrubba | H05K 7/18 165/80.4 |
| 4,498,119 A * | 2/1985 | Cronin | H05K 7/1404 361/721 |
| 7,259,963 B2 * | 8/2007 | Germagian | H05K 7/20745 361/690 |

(Continued)

FOREIGN PATENT DOCUMENTS

EP    2 741 519 A1    6/2014
WO    2008/128311 A2    10/2008

OTHER PUBLICATIONS

International Search Report, dated Jan. 5, 2016, from corresponding PCT/FI2015/050258 application.

*Primary Examiner* — Xanthia C Cunningham
(74) *Attorney, Agent, or Firm* — Young & Thompson

(57) ABSTRACT

A device-frame for telecommunication devices includes a body-section that includes plug-in unit places for the telecommunication devices. The device-frame further includes an air-guide element movably supported to the body-section so that a flow area of an air-intake of the device-frame is increasable by changing the position of the air-guide element with respect to the body-section so that the height of the device-frame increases and the flow area is decreasable by changing the position of the air-guide element so that the height of the device-frame decreases. The height of the device-frame can be adjusted to be smaller in cases where the circumstances are not the most demanding from the viewpoint of the cooling and therefore, in less demanding circumstances, it is possible to have more device-frames in a rack.

8 Claims, 2 Drawing Sheets

(56) References Cited

U.S. PATENT DOCUMENTS

| | | | | |
|---|---|---|---|---|
| 7,262,964 | B1* | 8/2007 | Barsun | H05K 7/20154 |
| | | | | 165/104.33 |
| 7,841,199 | B2* | 11/2010 | VanGilder | H05K 7/20745 |
| | | | | 62/259.2 |
| 7,903,403 | B2* | 3/2011 | Doll | H05K 7/20736 |
| | | | | 361/679.48 |
| 9,655,284 | B2* | 5/2017 | Milligan | H05K 7/20145 |
| 2005/0113015 | A1* | 5/2005 | Crippen | H05K 7/2019 |
| | | | | 454/184 |
| 2005/0286236 | A1* | 12/2005 | Clinard | H05K 7/1492 |
| | | | | 361/727 |
| 2007/0264921 | A1* | 11/2007 | Letourneau | H05K 7/20009 |
| | | | | 454/1 |
| 2009/0122484 | A1* | 5/2009 | Caveney | H05K 7/20572 |
| | | | | 361/692 |
| 2009/0129016 | A1* | 5/2009 | Hoeft | H05K 7/20745 |
| | | | | 361/694 |
| 2014/0118924 | A1* | 5/2014 | Magarelli | G06F 1/206 |
| | | | | 361/679.46 |
| 2014/0153169 | A1* | 6/2014 | Kohonen | H04Q 1/025 |
| | | | | 361/679.01 |
| 2014/0179214 | A1* | 6/2014 | Rinke | H05K 7/20727 |
| | | | | 454/184 |
| 2015/0163957 | A1* | 6/2015 | Martinez-Cruz | |
| | | | | H05K 7/20009 |
| | | | | 454/184 |
| 2015/0296657 | A1* | 10/2015 | Veino | H05K 7/20145 |
| | | | | 165/96 |

* cited by examiner

DEVICE-FRAME FOR TELECOMMUNICATION DEVICES

FIELD OF THE DISCLOSURE

The disclosure relates generally to telecommunication equipment where telecommunication devices are placed in plug-in unit places of device-frames that are installed in a rack. Furthermore, the disclosure relates to a device-frame for telecommunication devices.

BACKGROUND

In many cases it is advantageous that telecommunication equipment is modular so that the telecommunication equipment comprises a rack and telecommunication devices are installed directly or with the aid of device-frames in the rack. In this document, the term "telecommunication" includes also "data communication" and other data and message transfer technologies. The above-mentioned telecommunication devices may constitute, for example but not necessarily, one or more internet protocol "IP" routers, one or more Ethernet switches, one or more Asynchronous Transfer Mode "ATM" switches, one or more MultiProtocol Label Switching "MPLS" switches, and/or one or more packet optical switches.

A rack of modular telecommunication equipment may comprise for example mutually parallel rails that are substantially vertical when the rack is in its operating position. The telecommunication devices of the telecommunication equipment can be for example plug-in units that are installed in plug-in unit places of one or more device-frames that are, in turn, attached to the vertical rails of the rack. In many cases, the lower part of each device-frame comprises an air-intake for receiving cooling air and the upper part of the device-frame comprises an air-outlet through which the cooling air can leave the device-frame. When the cooling air flows from the air-intake to the air-outlet, the cooling air transfers heat from the plug-in units that are installed in the plug-in unit places of the device-frame under consideration. In many cases, the device-frame further comprises a blower for moving the cooling air through the device-frame. Furthermore, the device-frame may comprise a filter for filtering the cooling air prior to the cooling air meets the plug-in units.

An inherent inconvenience related to device-frames of the kind described above is that the cooling arrangement has to be designed according to the most demanding circumstances. Thus, for example the above-mentioned air-intake that has been designed according to the most demanding circumstances may require unnecessarily much room in the vertical direction in less demanding circumstances. The space requirement in the vertical direction is critical because, in many cases, it determines the number of device-frames that can be installed in a rack.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new device-frame for telecommunication devices that may constitute, for example but not necessarily, one or more internet protocol "IP" routers, one or more Ethernet switches, one or more Asynchronous Transfer Mode "ATM" switches, one or more MultiProtocol Label Switching "MPLS" switches, and/or one or more packet optical switches.

A device-frame according to the invention comprises:
- a body-section comprising plug-in unit places for the telecommunication devices, and
- an air-guide element movably supported to the body-section so that a flow area of an air-intake of the device-frame is increasable by changing the position of the air-guide element with respect to the body-section so that the height of the device-frame increases and the flow area is decreasable by changing the position of the air-guide element with respect to the body-section so that the height of the device-frame decreases.

The height of the device-frame can be adjusted to be smaller in a case where the circumstances are not the most demanding from the viewpoint of the cooling and therefore, in less demanding circumstances, it is possible that there can be more device-frames in a rack of telecommunication equipment.

In accordance with the invention, there is provided also new telecommunication equipment that comprises:
- a rack,
- one or more device-frames according to the invention and installed in the rack, and
- one or more telecommunication devices placed in the plug-in unit places of the one or more device-frames.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below in the sense of examples and with reference to the accompanying drawings, in which:

FIGS. 1b and 1c show a side view of one of the device-frames of the telecommunication equipment shown in FIG. 1a.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
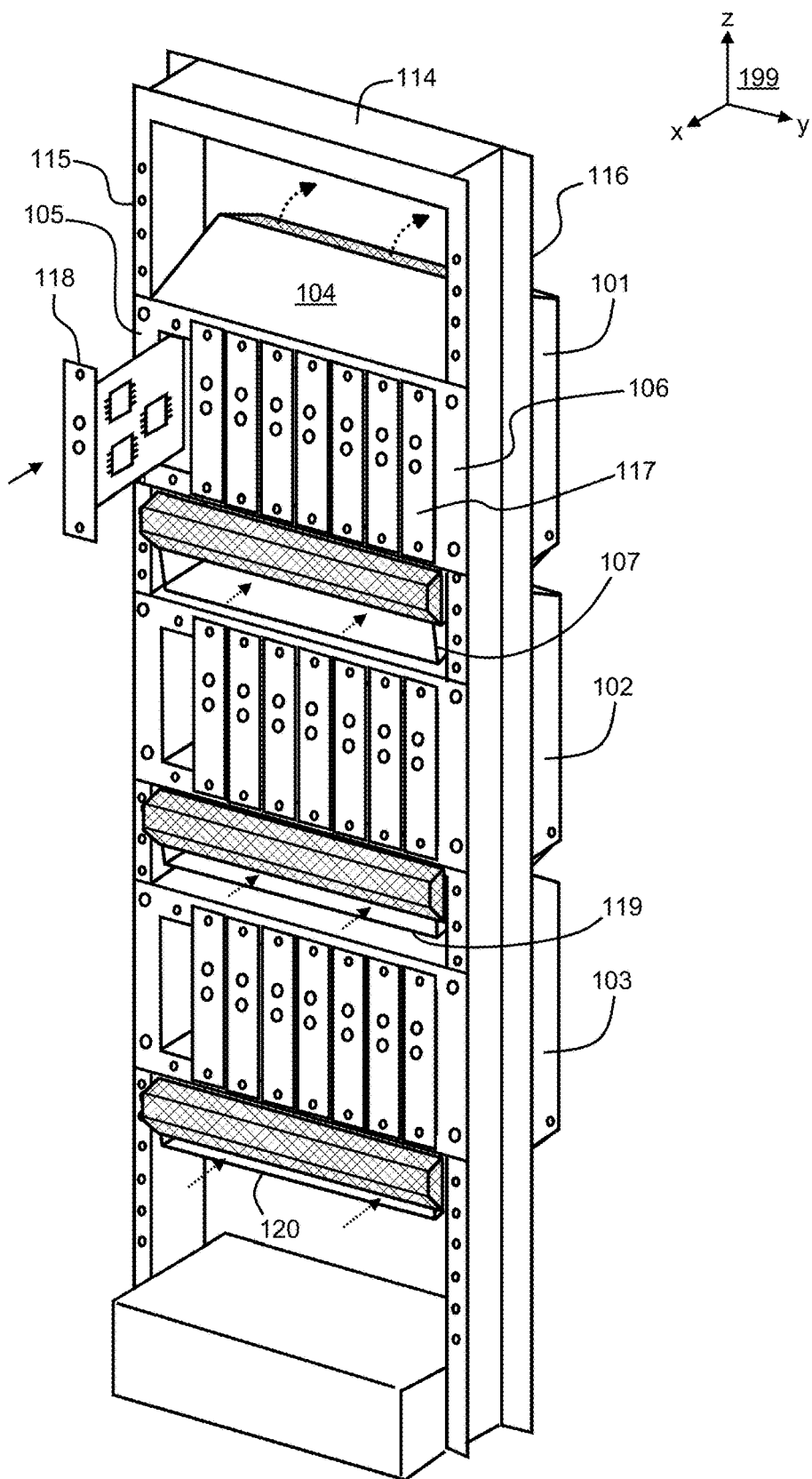
FIG. 1a shows a perspective view of telecommunication equipment according to an exemplifying and non-limiting embodiment of the invention.

FIG. 1a shows a perspective view of telecommunication equipment according to an exemplifying and non-limiting embodiment of the invention. The telecommunication equipment comprises a rack 114 and device-frames 101, 102, and 103 installed in the rack. In this exemplifying case, the rack comprises mutually parallel rails 115 and 116 that are substantially vertical when the rack 114 is in its operating position. Each of the device-frames 101-103 comprises a body-section that comprises plug-in unit places, i.e. plug-in unit slots, for telecommunication devices. Each of the device-frames 101-103 comprises mechanical structures for connecting the device-frame to the rack 114. In the exemplifying case illustrated in FIG. 1a, the mechanical structures are flanges with the aid of which the device-frame under consideration can be attached to the rails 115 and 116 of the rack as illustrated in FIG. 1a. In FIG. 1a, the body-section of the device-frame 101 is denoted with a reference number 104 and the above-mentioned mechanical structures, i.e. the flanges, of the device-frame 101 are denoted with reference numbers 105 and 106. It is, however, also possible that there is another kind of mechanical arrangement for attaching the device-frames to the rack. The rack could comprise for example horizontal beams on which the device-frames can be placed. The above-mentioned telecommunication devices are plug-in units that can be installed in the plug-in unit places of the device-frames 101-103. In FIG. 1a, two of the telecommunication devices are denoted with reference numbers 117 and 118. The front section of each device-frame allows the telecommunication devices to be inserted in the device-frame under consideration. FIG. 1a illustrates insertion of the telecommunication device 118 in the device-frame 101. The telecommunication devices may constitute, for example but not necessarily, one or more internet protocol "IP" routers, one or more Ethernet switches, one or more Asynchronous Transfer Mode "ATM" switches, one or more MultiProtocol Label Switching "MPLS" switches, and/or one or more packet optical switches.

Each of the device-frames 101-103 comprises an air-guide element movably supported to the body-section of the device-frame. The flow area of an air-intake of the device-frame is increasable by changing the position of the air-guide element with respect to the body-section so that the height of the device-frame increases. Correspondingly, the flow area is decreasable by changing the position of the air-guide element with respect to the body-section so that the height of the device-frame decreases. The heights of the device-frames are measured in the z-direction of a coordinate system 199. In FIG. 1a, the adjustable air-guide elements of the device-frames 101-103 are denoted with reference numbers 107, 119, and 120.

Figure 1B:
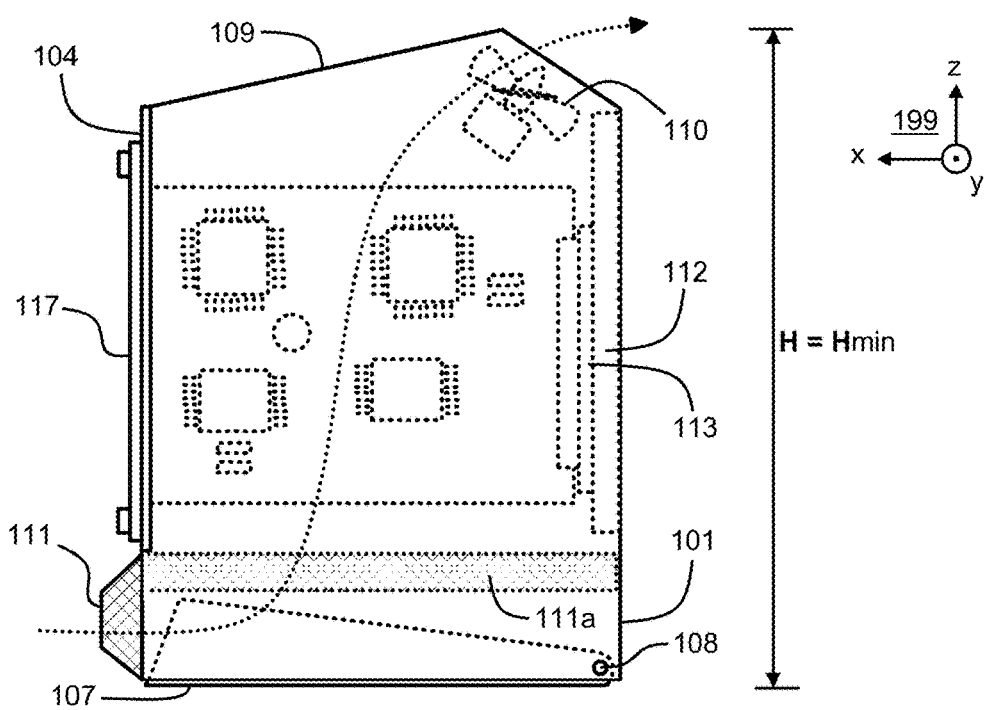
Figure 1C:
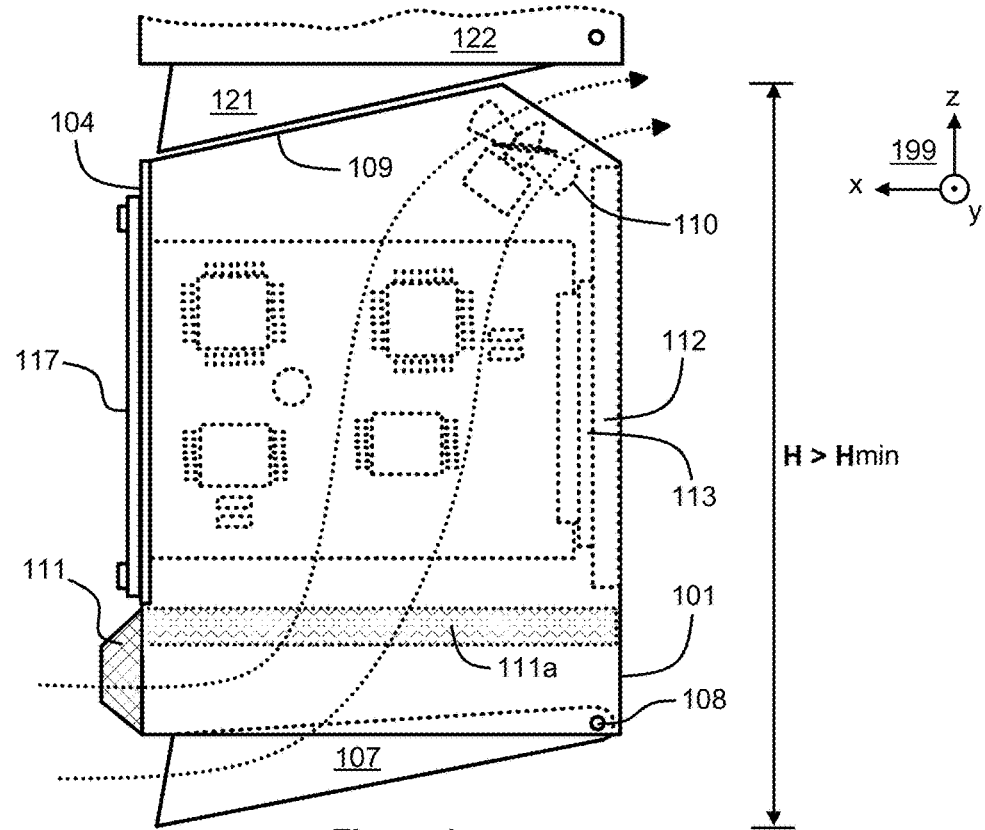

Without limiting the generality and merely for illustrative purposes we consider the device-frame 101. FIGS. 1b and 1c show a side view of the device-frame 101. FIGS. 1a and 1b show the telecommunication device 117 so that the part of the telecommunication device 117 that is inside the device-frame 101 is depicted with dashed lines. The viewing directions related to FIGS. 1a-1c are illustrated with the coordinate system 199. FIG. 1b illustrates an exemplifying situation where the air-guide element 107 is in a position where the flow area of the air-intake and the height H of the device-frame 101 are minimized, whereas FIG. 1c illustrates an exemplifying situation where the air-guide element 107 is in another position where the flow area of the air-intake and the height H of the device frame 101 are greater. In FIGS. 1a-1c, the flow of the cooling air is depicted with dashed line arrows.

The adjustable air-guide elements 107, 119, and 120 of the device-frames 101-103 make it possible to change the intakes of the cooling air in accordance with case-specific needs. For example, the air intake of a device-frame that is higher in the rack can be set to be greater than that of another device-frame that is lower in the rack. FIG. 1a shows an exemplifying case where the air-guide element 107 of the upmost device-frame 101 is most open, the air-guide element 120 of the undermost device-frame 103 is least open, and the position of air-guide element 119 of the device-frame 102 is between the positions of the air-guide elements 107 and 120. In many cases, the movability of the air-guide elements 107, 119, and 120 makes it easier to install a cabling between the device-frames 101-103 and cables from/to the device frames to/from elsewhere in an equipment room. The cables from/to the device-frames to/from elsewhere in the equipment room are advantageously drawn via an upper part of the rack 114 so that the cables can be on shelves or on other support means near the ceiling of the equipment room and thus the operating persons do not have to watch out the cables. Furthermore, the adjustable air-guide elements do not complicate the transportation of the device-frames because each air-guide element can be positioned as illustrated in FIG. 1b during transportation of the device-frame under consideration. As a corollary, e.g. a transportation box can be dimensioned according to the smallest height Hmin corresponding to the situation shown in FIG. 1b. In the exemplifying telecommunication equipment illustrated in FIG. 1a, every device-frame comprises an adjustable air-guide element. It is, however, also possible that telecommunication equipment according to another exemplifying embodiment of the invention comprises one or more device-frames each provided with an adjustable air-guide element and, in addition, one or more device-frames that do not comprise an adjustable air-guide element.

In the exemplifying case illustrated in FIGS. 1a-1c, the air-guide element 107 is hinged to the body-section 104 so that the flow area of the air-intake of the device-frame 101 is increasable by turning the air-guide element with respect to the body-section so that the height H of the device-frame increases and, correspondingly, the flow area is decreasable by turning the air-guide element with respect to the body-section so that the height of the device-frame decreases. This is illustrated in FIGS. 1b and 1c. The turning axis 108 of the hinged air-guide element 107 is substantially perpendicular to the height H of the device-frame and substantially parallel with the width of the device-frame. The width the device-frame is measured in the y-direction of the coordinate system 199. Therefore, the turning axis 108 of the hinged air-guide element 107 is substantially parallel with the y-axis of the coordinate system 199. As illustrated in FIG. 1a, the plug-in unit places are side-by-side in the direction of the width, i.e. in the lateral direction, of the device-frame. As illustrated in FIGS. 1a-1c, the turning axis 108 of the air-guide element is located at a portion of the device-frame 101 that is the lower portion of the rear section of the device-frame when the device-frame is in its operating position. The rear section is on the opposite side of the device-frame with respect to the front section through which the telecommunication devices can be inserted in the device-frame. It is, however, also possible that an air-guide element is movably supported to the body-section of a device-frame with other means than being hinged. For example, instead of being hinged, an air-guide element can be movably supported to the body-section with sliding means.

In a device-frame according to an exemplifying and non-limiting embodiment of the invention, a portion of the device-frame that is an upper portion of the device-frame when the device-frame is in its operating position is oblique so that a shape of the upper portion of the device-frame fits to a hinged air-guide element of another device-frame in a situation in which the other device-frame is above the first mentioned device-frame and the hinged air-guide element of the other device-frame has been turned downwards. In FIGS. 1b and 1b, the oblique upper portion of the device-frame is denoted with a reference number 109. FIG. 1c illustrates how the shape of the upper portion 109 of the device-frame 101 fits to the hinged air-guide element 121 of another device-frame 122. The oblique upper portion 109 reduces a vertical distance needed between the body-sections of the device-frames 101 and 122.

A device-frame according to an exemplifying and non-limiting embodiment of the invention comprises one or more blowers 110 for moving the cooling air through the device-frame. In FIGS. 1b and 1c, the one or more blowers 110 is/are depicted with dashed lines because the one or more blowers is/are inside the body-section 104 of the device-frame 101. In the exemplifying case illustrated in FIGS. 1b and 1c, the one or more blowers 110 is/are at the air-outlet through which the cooling air leaves the device-frame 101 but it is also possible that there is/are one or more blowers at the air-intake for receiving the cooling air.

A device-frame according to an exemplifying and non-limiting embodiment of the invention comprises a filter 111 for filtering the cooling air arriving at the device-frame. In FIGS. 1b and 1c, the part 111a of the filter 111 that is inside the body-section 104 of the device-frame 101 is depicted with dashed lines. The part 111a of the filter is needed for filtering the portion of the incoming cooling air that passes, as shown in FIG. 1c, the front part of the filter. The filter 111 may comprise for example filter paper and/or filter fabric and a filter frame for supporting the filter paper and/or the filter fabric.

A device-frame according to an exemplifying and non-limiting embodiment of the invention comprises a back-plane 112 that comprises electrical connectors for connecting to the telecommunication devices and wirings for communicatively interconnecting the telecommunication devices. In FIGS. 1b and 1c, the back-plane 112 and one of the electrical connectors are depicted with dashed lines. The one of the electrical connectors is denoted with a reference number 113. In principle, it is possible to use separate cablings for arranging the connections between the telecommunication devices but in practice the approach based on the back-plane comprising the electrical connectors and the wirings is usually more advantageous.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A device-frame for telecommunication devices, the device-frame comprising:
    a body-section comprising plug-in unit places for the telecommunication devices; and
    an air-guide element hinged to the body-section so that a flow area of an air-intake of the device-frame is increasable by turning the air-guide element with respect to the body-section so that a height of the device-frame increases and the flow area is decreasable by changing a position of the air-guide element with respect to the body-section so that the height of the device-frame decreases,
    wherein a portion of the body-section of the device-frame that is an upper portion of the device-frame, when the device-frame is in an operating position, is oblique so that a shape of the upper portion of the device-frame fits to a hinged air-guide element of an other device-frame in a situation in which the other device-frame is above the device-frame and the hinged air-guide element of the other device-frame has been turned downwards, the oblique upper portion reducing a vertical distance required between the respective body-sections of the device-frame and the other device-frame.

2. The device-frame according to claim 1, wherein a turning axis of the hinged air-guide element is substantially perpendicular to the height of the device-frame and substantially parallel with a width of the device-frame, the plug-in unit places being side-by-side in a direction of the width of the device-frame and a front section of the device-frame allowing the telecommunication devices to be inserted in the device-frame.

3. The device-frame according to claim 2, wherein the turning axis of the air-guide element is located at a portion of the device-frame that is a lower portion of a rear section of the device-frame when the device-frame is in the operating position.

4. The device-frame according to claim 1, further comprising:
    one or more blowers for moving cooling air through the device-frame.

5. The device-frame according to claim 1, further comprising:
    a filter for filtering cooling air arriving at the device-frame.

6. The device-frame according to claim 1, further comprising:
    a back-plane comprising electrical connectors for connecting to the telecommunication devices and wirings for communicatively interconnecting the telecommunication devices.

7. Telecommunication equipment, comprising:
    a rack;
    one or more device-frames installed in the rack; and
    one or more telecommunication devices placed in plug-in unit places of the one or more device-frames,
    wherein each device-frame comprises:
        a body-section comprising the plug-in unit places for the telecommunication devices, and
        an air-guide element hinged to the body-section so that a flow area of an air-intake of the device-frame is increasable by turning the air-guide element with respect to the body-section so that a height of the device-frame increases and the flow area is decreasable by turning the air-guide element with respect to the body-section so that the height of the device-frame decreases,
    and wherein a portion of the body-section of the device-frame that is an upper portion of the device-frame, when the device-frame is in an operating position, is oblique so that a shape of the upper portion of the device-frame fits to a hinged air-guide element of an other device-frame in a situation in which the other device-frame is above the device-frame and the hinged air-guide element of the other device-frame has been turned downwards, the oblique upper portion reducing a vertical distance required between the body-sections of the device-frames.

8. The telecommunication equipment according to claim 7, wherein the one or more telecommunication devices constitute one or more of the following: an internet protocol "IP" router, an Ethernet switch, an Asynchronous Transfer Mode "ATM" switch, a MultiProtocol Label Switching "MPLS" switch, a packet optical switch.

\* \* \* \* \*